US012160063B2

(12) United States Patent
Tanaka

(10) Patent No.: US 12,160,063 B2
(45) Date of Patent: Dec. 3, 2024

(54) CONNECTOR AND CONNECTOR PAIR

(71) Applicant: Molex, LLC, Lisle, IL (US)

(72) Inventor: Satoshi Tanaka, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/234,404

(22) Filed: Aug. 16, 2023

(65) Prior Publication Data

US 2023/0396012 A1 Dec. 7, 2023

Related U.S. Application Data

(63) Continuation of application No. 17/411,125, filed on Aug. 25, 2021, now Pat. No. 11,764,510.

(30) Foreign Application Priority Data

Oct. 26, 2020 (JP) ................................ 2020-178779

(51) Int. Cl.

*H01R 13/502* (2006.01)
*H01R 12/71* (2011.01)
*H01R 13/629* (2006.01)

(52) U.S. Cl.

CPC ......... *H01R 13/502* (2013.01); *H01R 12/716* (2013.01); *H01R 13/629* (2013.01)

(58) Field of Classification Search

CPC .. H01R 13/502; H01R 12/716; H01R 13/629; H01R 12/73; H01R 13/40; H01R 12/71; H01R 13/02; H01R 13/22; H01R 24/00; H01R 12/7005

See application file for complete search history.

(56) References Cited

U.S. PATENT DOCUMENTS

D540,263 S 4/2007 Kishi et al.
D562,774 S 2/2008 Kojima et al.
D641,705 S 7/2011 Sato et al.
(Continued)

FOREIGN PATENT DOCUMENTS

CN 209860225 U 12/2019
CN 211404849 U 9/2020
(Continued)

OTHER PUBLICATIONS

Non-Final office action received for U.S. Appl. No. 17/411,125 mailed on Feb. 1, 2023, 07 pages.
(Continued)

*Primary Examiner* — Abdullah A Riyami
*Assistant Examiner* — Nader J Alhawamdeh

(57) ABSTRACT

A connector including:
a connector main body;
a terminal attached to the connector main body; and
a reinforcement fitting attached to the connector main body; wherein
the connector main body is able to mate with a counterpart connector that is the counterpart connector main body of a counterpart connector and includes an islet,
the reinforcement fitting includes an upper surface part, an end surface part connected to the upper surface via a rear curved part, and a side surface part connected to the end surface part via a side curved part, and
the rear curved part covers the corner between the upper surface and end surface of the connector main body and the side curved part covers the corner of the end surface and the side surface of the connector main body.

18 Claims, 11 Drawing Sheets

(56) References Cited

U.S. PATENT DOCUMENTS

| | | | | |
|---|---|---|---|---|
| D643,369 | S | 8/2011 | Sato et al. | |
| D684,121 | S | 6/2013 | Miyazaki et al. | |
| D684,932 | S | 6/2013 | Nishimura et al. | |
| 8,840,407 | B2 | 9/2014 | Nose et al. | |
| D720,699 | S | 1/2015 | Watanabe | |
| D722,295 | S | 2/2015 | Miyazaki | |
| D722,568 | S | 2/2015 | Ueda et al. | |
| D739,825 | S | 9/2015 | Omodachi et al. | |
| 9,300,064 | B2 | 3/2016 | Takenaga et al. | |
| 9,325,103 | B2 | 4/2016 | Arai et al. | |
| 9,350,097 | B2 * | 5/2016 | Yunoki | H01R 12/716 |
| D760,659 | S | 7/2016 | Takemoto | |
| D774,462 | S | 12/2016 | Omodachi et al. | |
| 9,692,167 | B2 | 6/2017 | Kobuchi et al. | |
| D792,854 | S | 7/2017 | Ashibu | |
| 9,728,882 | B1 | 8/2017 | Nakazawa | |
| D826,166 | S | 8/2018 | Yayoshi | |
| D834,524 | S | 11/2018 | Yayoshi | |
| 10,498,058 | B1 | 12/2019 | Kitazawa et al. | |
| 10,566,735 | B2 | 2/2020 | Ashibu | |
| 10,594,077 | B2 | 3/2020 | Tanaka et al. | |
| 10,700,458 | B2 | 6/2020 | Hirakawa et al. | |
| 10,784,616 | B2 | 9/2020 | Gondo | |
| D913,953 | S | 3/2021 | Ashibu et al. | |
| 11,095,059 | B2 * | 8/2021 | Gondo | H01R 13/447 |
| 11,158,968 | B2 | 10/2021 | Tanaka et al. | |
| 11,404,807 | B2 * | 8/2022 | Ko | H01R 27/00 |
| D987,575 | S | 5/2023 | Omodachi et al. | |
| D1,033,366 | S | 7/2024 | Tanaka | |
| 2014/0364003 | A1 * | 12/2014 | Yunoki | H01R 12/716 439/374 |
| 2018/0358729 | A1 | 12/2018 | Chen | |
| 2019/0363467 | A1 * | 11/2019 | Ko | H01R 13/5045 |
| 2020/0067217 | A1 | 2/2020 | Ashibu | |
| 2020/0127400 | A1 | 4/2020 | Sasayama et al. | |
| 2020/0343659 | A1 | 10/2020 | Gondo | |
| 2020/0381856 | A1 * | 12/2020 | Meng | H01R 13/6594 |
| 2020/0403336 | A1 * | 12/2020 | Xie | H01R 13/115 |
| 2022/0052468 | A1 | 2/2022 | Chang et al. | |
| 2022/0131303 | A1 | 4/2022 | Tanaka | |
| 2022/0285873 | A1 | 9/2022 | Wang et al. | |

FOREIGN PATENT DOCUMENTS

| | | | | | |
|---|---|---|---|---|---|
| EP | 3293832 | A1 | | 3/2018 | |
| JP | 2011060650 | A | | 3/2011 | |
| JP | 2013206771 | A | | 10/2013 | |
| JP | 1509401 | S | | 10/2014 | |
| JP | 2015185541 | A | | 10/2015 | |
| JP | 2016152084 | A | | 8/2016 | |
| JP | 2018163894 | A | | 10/2018 | |
| JP | 1624138 | S | | 2/2019 | |
| JP | 2019186062 | A | | 10/2019 | |
| JP | 3227392 | U | | 8/2020 | |
| JP | 2022028603 | A | | 2/2022 | |
| JP | 2022033394 | A | | 3/2022 | |
| KR | 20160089216 | A | | 7/2016 | |
| KR | 20180111144 | A | | 10/2018 | |
| KR | 20180123980 | A | | 11/2018 | |
| TW | 201817094 | A | | 5/2018 | |
| TW | D190544 | S | | 5/2018 | |
| TW | D197648 | S | | 5/2019 | |
| TW | M600487 | U | | 8/2020 | |
| TW | M601467 | U | | 9/2020 | |
| TW | M601913 | U | * | 9/2020 | H01R 12/716 |
| WO | 2011032146 | A1 | | 3/2011 | |
| WO | 2019244549 | A1 | | 12/2019 | |

OTHER PUBLICATIONS

Non-Final office action received for U.S. Appl. No. 29/812,756 mailed on Sep. 13, 2023, 15 pages.

Non-Final office action received for U.S. Appl. No. 29/812,781 mailed on Sep. 13, 2023, 15 pages.

Final office action received for U.S. Appl. No. 29/812,781, mailed on Sep. 11, 2024, 7 pages.

* cited by examiner

CONNECTOR AND CONNECTOR PAIR

RELATED APPLICATION

This application is a Continuation application of Ser. No. 17/411,125 filed on Aug. 25, 2021, which claims priority to Japanese Patent Application No. 2020-178779, filed on Oct. 26, 2020, the disclosures of which are incorporated by reference herein in their entirety.

TECHNICAL FIELD

The present disclosure relates to a connector and a connector pair.

BACKGROUND

Conventionally, connectors such as board-to-board connectors have been used to electrically connect pairs of parallel circuit boards to each other. Such connectors are attached to each of opposing surfaces of the pair of circuit boards, and fitted together to secure electric conduction. Furthermore, a technology has been proposed in which a reinforcement fitting attached to two ends functions as a power terminal to conduct current of a power source between a connector and a mating connector (for example, see Patent Document 1).

FIG. 11 is a perspective view illustrating a conventional connector.

In the figures, 811 represents a housing of a plug connector serving as a connector mounted on a surface of a first circuit board (not illustrated), which has a pair of protruding parts 812 that are inserted into a mating recessed part of a receptacle connector mounted on a surface of a second circuit board (not illustrated). The protruding part 812 is a convex strip part extending in a longitudinal direction of the housing 811, and a plurality of terminals 861 are arranged and supported in line at a predetermined pitch.

Furthermore, reinforcement fittings 851 are attached to two end parts in the longitudinal direction of the housing 811. The reinforcement fittings 851 protect the two end parts in the longitudinal direction of the housing 811 and also function as power terminals for energizing a current of a power source in contact with the reinforcement fittings of a receptacle connector not illustrated in the figures.

Furthermore, the reinforcement fitting 851 contains: an upper surface part 852 covering a portion of an upper surface of the housing 811; an end surface part 853 having an upper end connected to the upper surface part 852 via a curved part and extending in a direction orthogonal to the upper surface part 852 to cover a portion of an end surface of the housing 811; and a first side surface part 854 and second side surface part 855 connected to the upper surface part 852 and extending in a direction orthogonal to the upper surface part 852 to cover a portion of two, left and right, side surfaces of the housing 811. A lower end of the first side surface part 854 is connected, by soldering or other means, to a power connection pad formed on a surface of a first circuit board not illustrated in the figures. Furthermore, when the plug connector is mated with the receptacle connector, the second side surface part 855 contacts and conducts electricity with the reinforcement fitting of the receptacle connector.

Patent Document 1; Japanese Unexamined Patent Application 2015-185541

SUMMARY

However, with the aforementioned conventional connector, it is difficult to accurately control a position of an outer surface of the first side surface part 854 and an outer surface of the second side surface part 855 of the reinforcement fitting 851 with regard to a connector width direction.

The reinforcement fitting 851 is formed by punching a metal sheet to form an essentially flat plate member in which the upper surface part 852, the end surface part 853, the first side surface part 854, and the second side surface part 855 are integrally connected, and then bending the essentially flat plate member to make the end surface part 853, the first side surface part 854, and the second side surface part 855 orthogonal to the upper surface part 852.

At this time, for example, in order to form the outer surface of the first side surface part 854 and the outer surface of second side surface part 855 in a flush manner, the first side surface part 854 and the second side surface part 855 are in close proximity to each other on two, left and right, sides of the upper surface part 852. Therefore, the bending process is applied by the same die member at the same time. However, the members are mutually independent; therefore, the degree of bending is not strictly identical. Thus, it is difficult to make the outer surface of the first side surface part 854 and the outer surface of the second side surface part 855 strictly flush. Furthermore, for example, in order to deviate a position of the first side surface part 854 from a position of the second side surface part 855 in a width direction of the connector, a different degree of a bending process must be performed on the first side surface part 854 and the second side surface part 855. However, the first side surface part 854 and the second side surface part 855 are in close proximity to each other; therefore, it is difficult to individually perform high-precision bending process to the first side surface part 854 and the second side surface part 855.

In particular, in recent years, since connectors have become smaller and lower in profile, each part of the reinforcement fitting 851 has also become smaller, and it is extremely difficult to precisely control a position of the outer surface of the first side surface part 854 and the outer surface of the second side surface part 855 with regard to the width direction of the connector by applying a high-precision bending process to each of the first side surface part 854 and the second side surface part 855, which are fine and are in close proximity to each other on two, left and right, sides of the upper surface part 852.

Herein, in order to solve the problems of the conventional connector, an object of the present disclosure is to provide a highly reliable connector and connector pair provided with a reinforcement fitting having accurate dimensional accuracy in conjunction with exhibiting high strength and achieving a high shielding effect while having a compact and low profile.

A connector, including:

a connector main body;

a terminal attached to the connector main body; and a reinforcement fitting attached to the connector main body; wherein the connector main body is able to mate with a counterpart connector that is the counterpart connector main body of a counterpart connector and includes an islet, the reinforcement fitting includes an upper surface part, an end surface part connected to the upper surface via a rear curved part, and a side surface part connected to the end surface part via a side curved part, and the rear curved part covers the corner between the upper surface and end surface of the connector main body and the side curved part covers the corner of the end surface and the side surface of the connector main body.

With another connector, the side surface part further includes an upper end curved part connected to an upper end and contacts and conducts with a reinforcement fitting of the counterpart connector.

With still another connector,
the upper surface part further contains an insertion recessed part formed on two side edges in a width direction thereof, the second side surface part is connected to an upper end curved part and includes a support piece extending downward or obliquely downward, and
the support piece is inserted into the insertion recessed part.

With still another connector, the end surface part further includes a downward protruding part connected to the bottom end thereof, and the bottom end of the downward protruding part is connected to a connection pad on a substrate.

With still another connector, the bottom end of the side surface part is not connected to a connection pad on a substrate.

A connector pair includes a connector according to the present disclosure and a mating connector that mates with the connector.

According to the present disclosure, a connector can be provided with a reinforcement fitting that is small and low profile, yet exhibits high strength and accurate dimensional accuracy to improve reliability.

BRIEF DESCRIPTION OF THE DRAWINGS

FIG. 2A is a top view, and FIG. 2B is a side view.

FIG. 6A is a front surface view, FIG. 6B is a side view, FIG. 6C is a top view, and FIG. 6D is a bottom view.

FIG. 7A is a first perspective view, and FIG. 7B is a second perspective view.

FIG. 8A is a first perspective view, and FIG. 8B is a second perspective view.

FIG. 9A is a cross section view viewed along arrows A-Ain FIG. 2A, and FIG. 9B is a cross section view viewed along arrows B-B in FIG. 2A.

FIG. 10A is an overall view and FIG. 10B is an enlarged view of part C in FIG. 10A.

DETAILED DESCRIPTION

Embodiments will hereinafter be described in detail with reference to the drawings.

Figure 1:
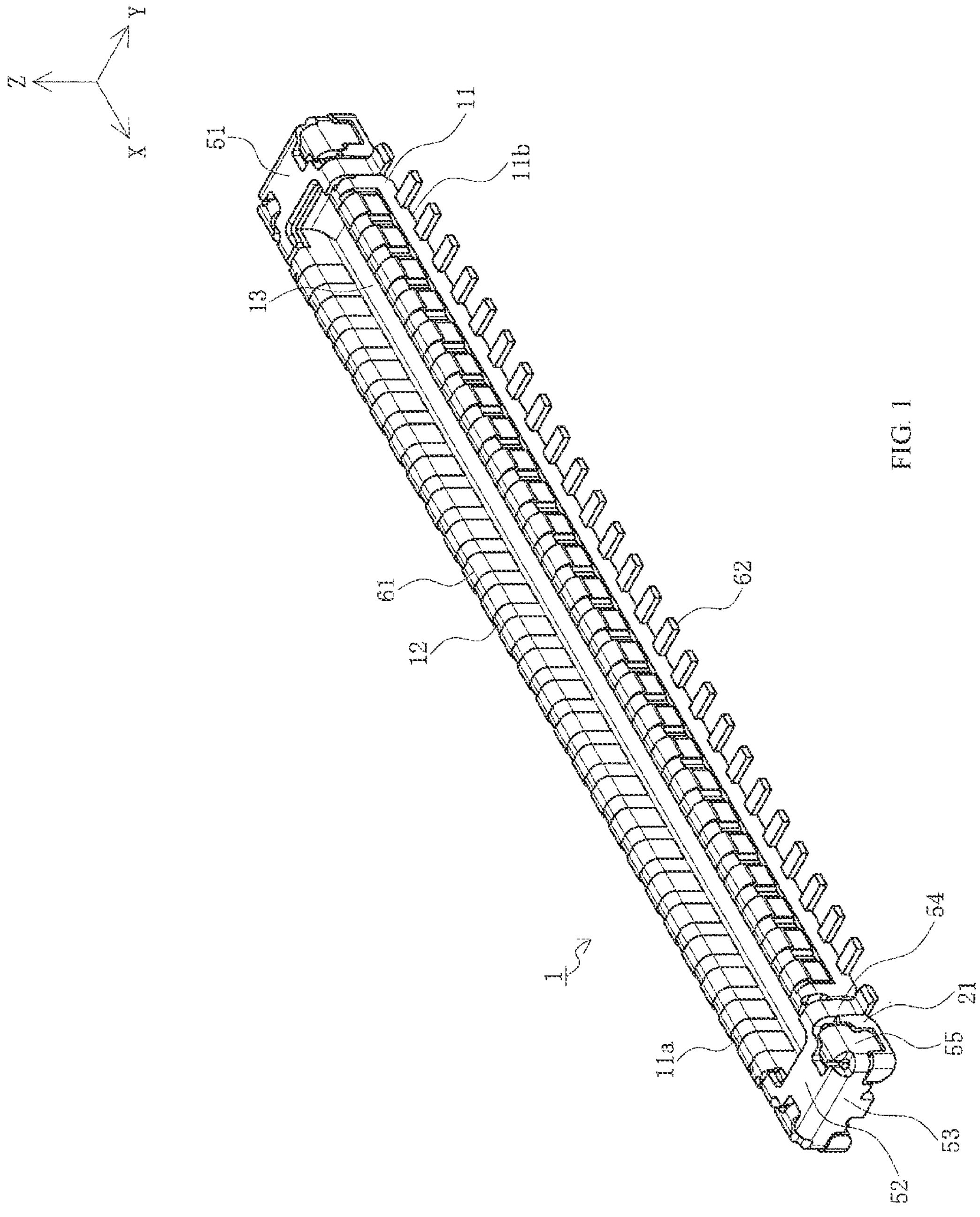
FIG. 1 is a perspective view of a first connector according to the present embodiment.
Figure 2A:
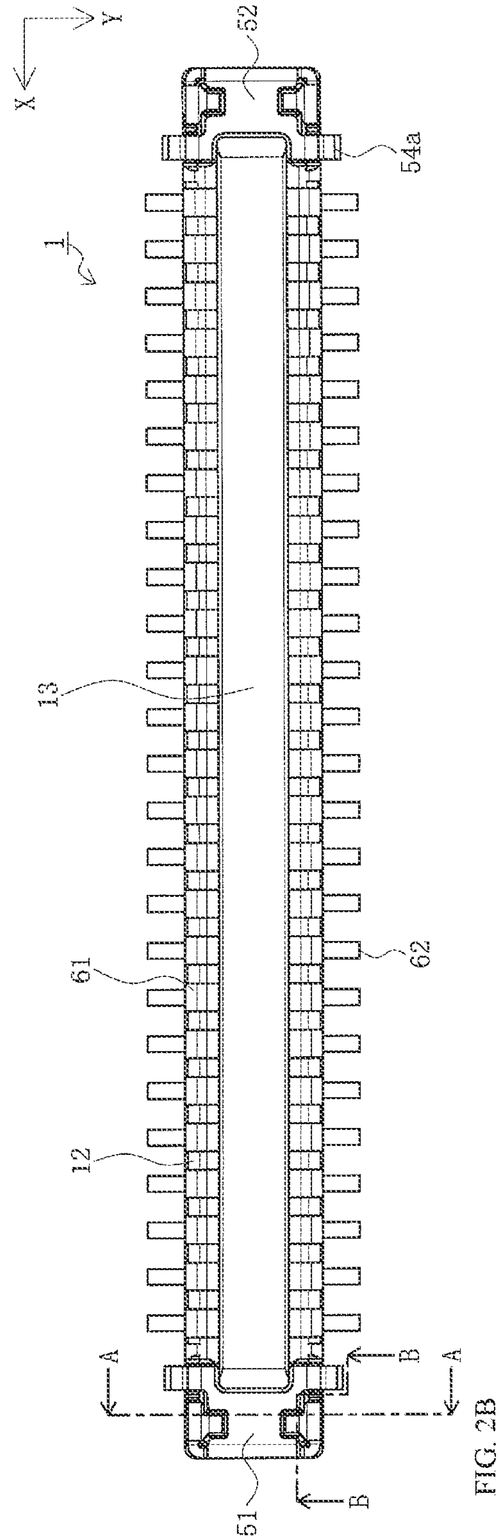
FIGS. 2A and 2B are two-plane diagram illustrating the first connector according to the present embodiment, where
Figure 2B:
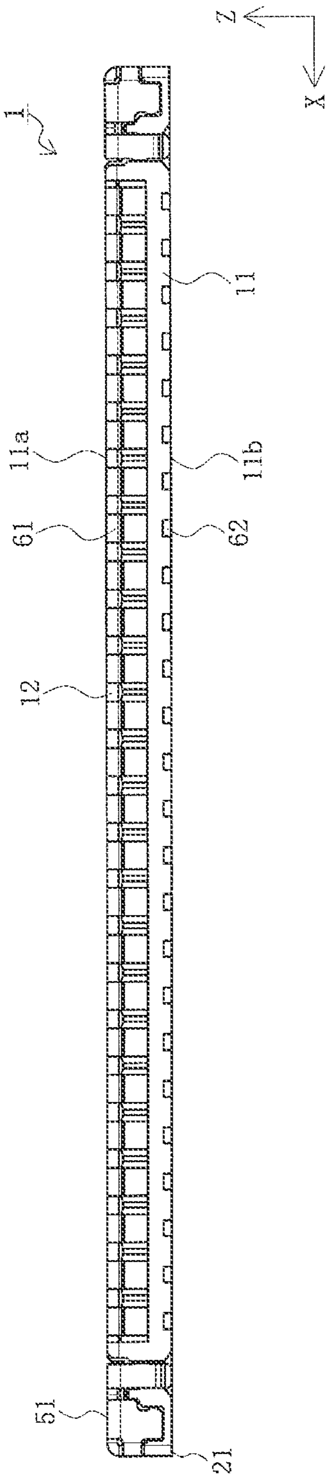
Figure 3:
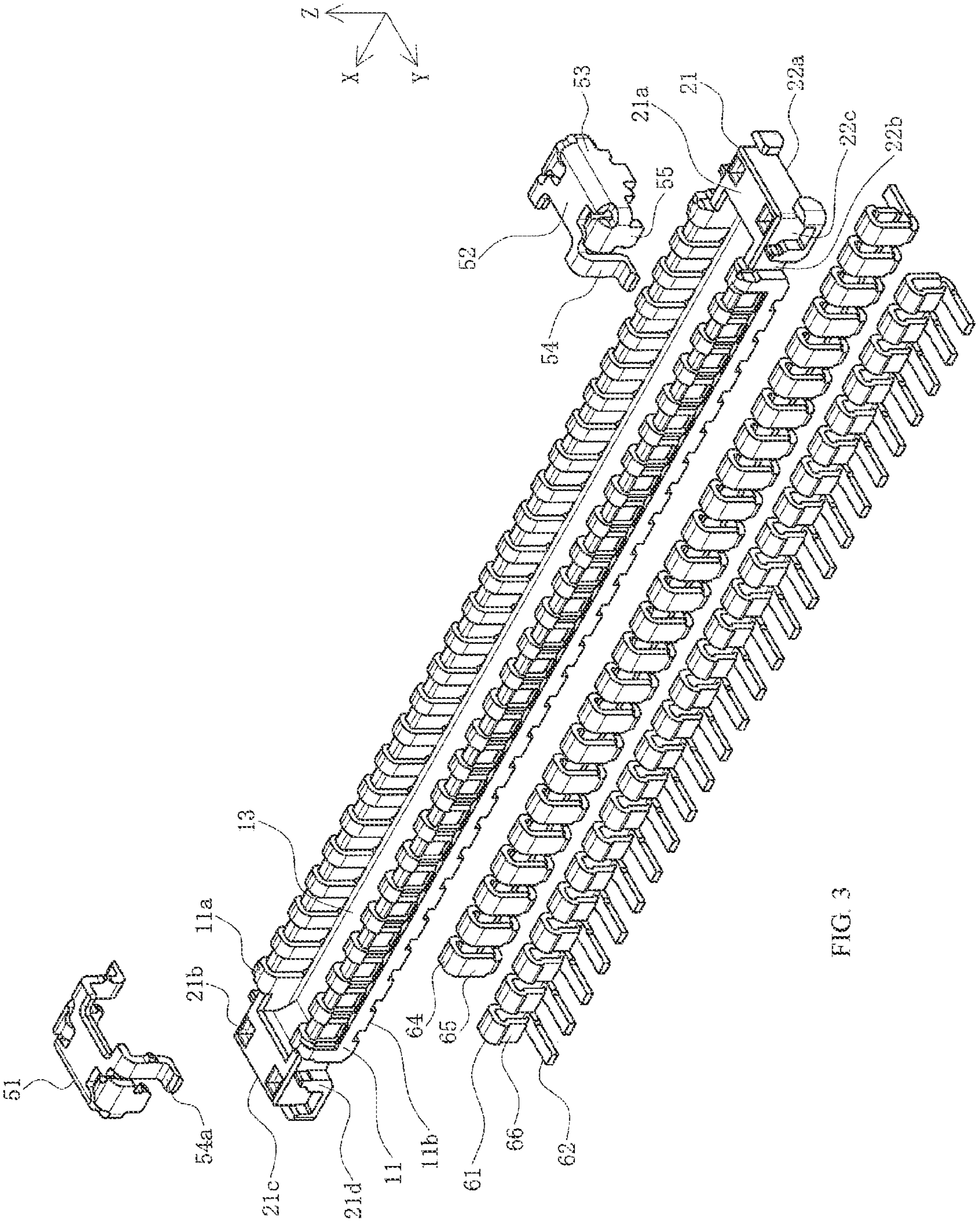
FIG. 3 is an exploded view of the first connector according to the present embodiment.
Figure 4:
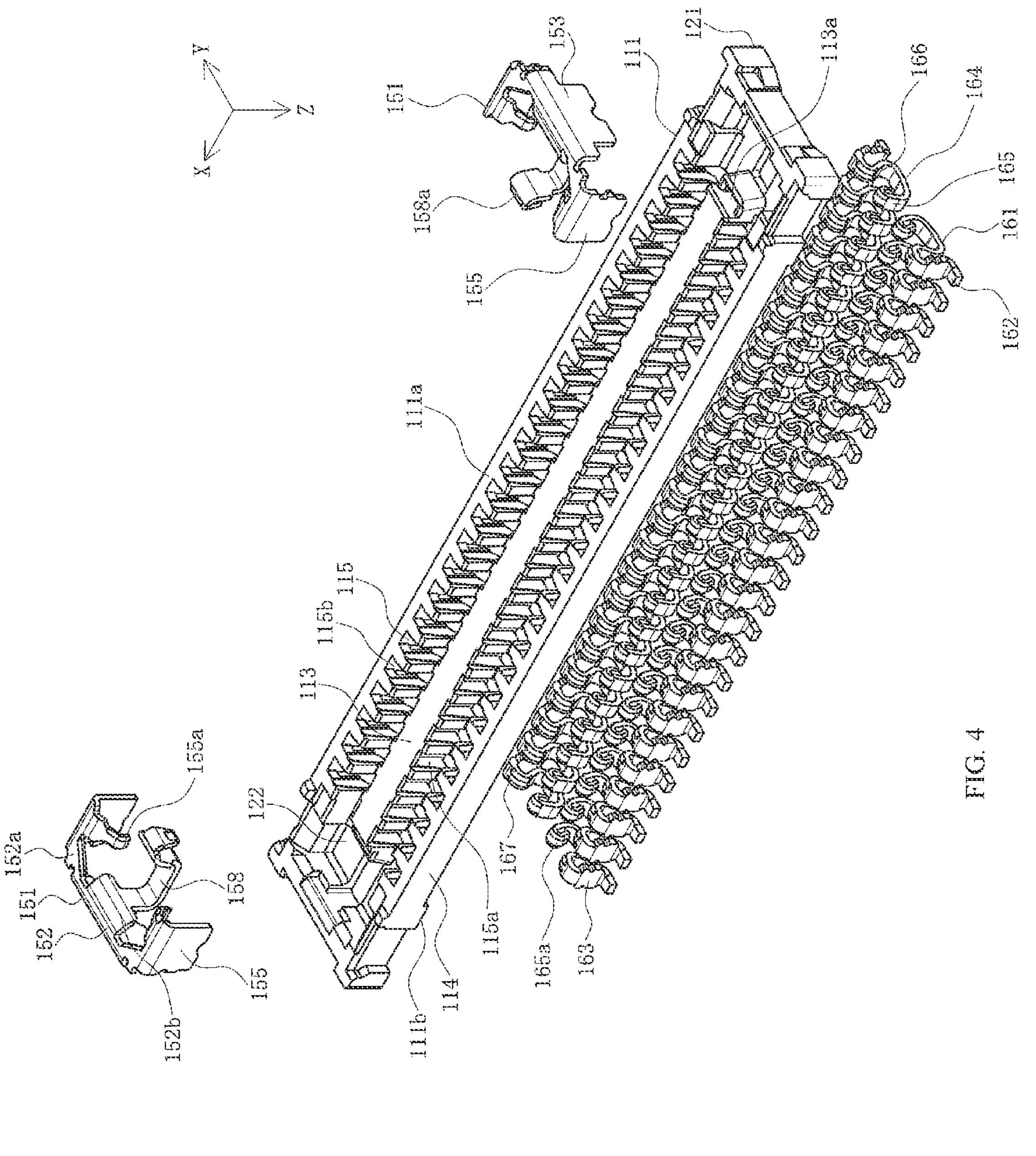
FIG. 4 is an exploded view of the second connector according to the present embodiment.
Figure 5:
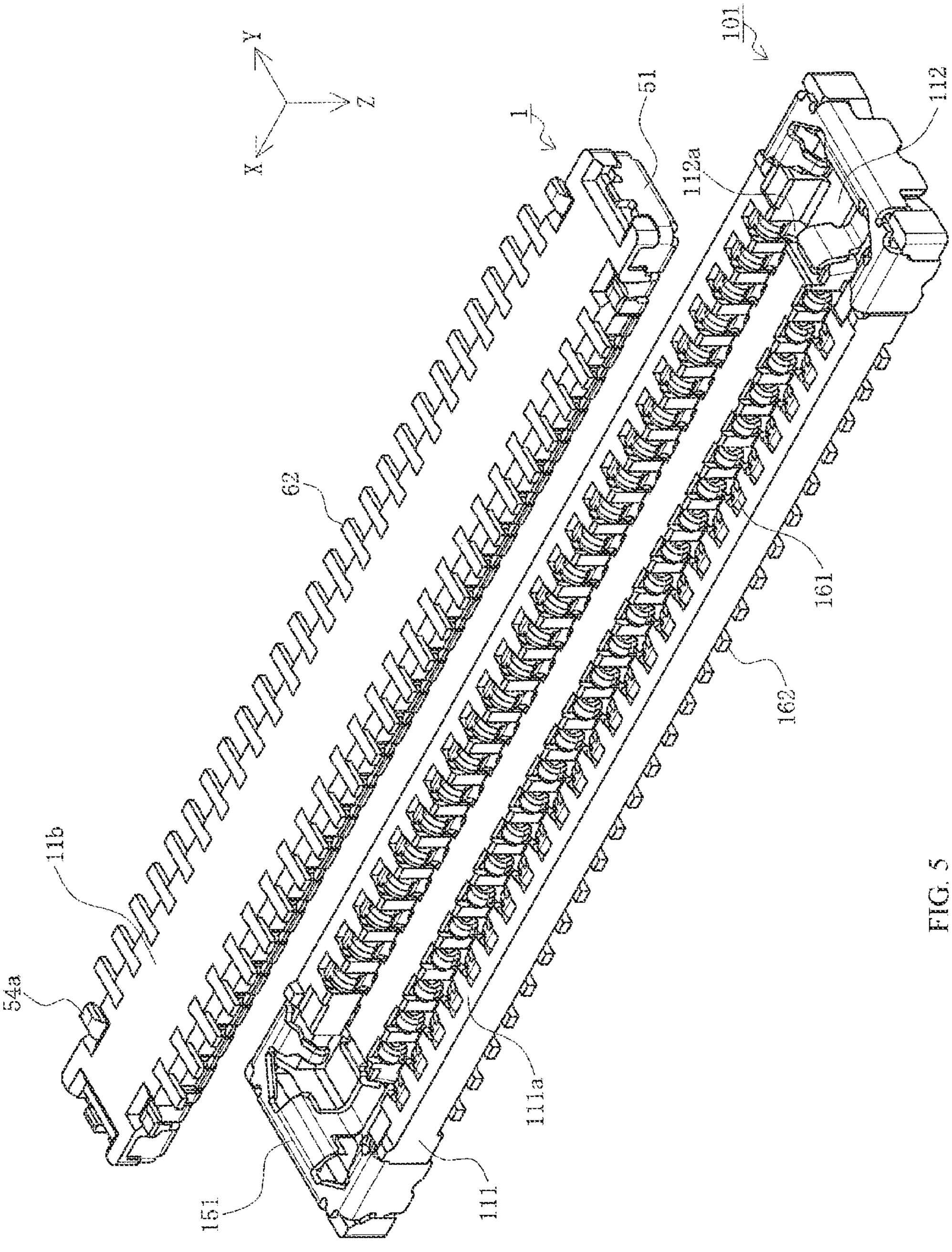
FIG. 5 is a perspective view illustrating a state before mating of the first connector with the second connector according to the present embodiment.

FIG. 1 is a perspective view illustrating a first connector according to the present embodiment; FIGS. 2A and 2B are two-plane diagram of the first connector according to the present embodiment; FIG. 3 is an exploded view of the first connector according to the present embodiment; FIG. 4 is an exploded view of a second connector according to the present embodiment; and FIG. 5 is a perspective view before the first connector and second connector are mated according to the present embodiment. Note that in FIGS. 2A and 2B, FIG. 2A is a top view, and FIG. 2B is a side view.

In the drawings, a first connector 1 is a connector of Embodiment 1, and is one of a pair of substrate-to-substrate connectors that is a connector pair. The first connector 1 is a surface mount type connector mounted on a surface of a first substrate (not illustrated), which is a substrate as a mounting member, and is mated with a second connector 101, which is a mating connector of a connector pair. Furthermore, the second connector 101 is the second of the pair of substrate-to-substrate connectors, is a surface mount type connector mounted on a surface of a second substrate (not illustrated), which is a substrate as a mounting member, and is mated with the first connector 1.

The first connector 1 and the second connector 101 of the present embodiment are preferably used to electrically connect the first substrate and the second substrate, and can also be used to electrically connect other members. For example, the first board and the second board are each a printed circuit board, a flexible flat cable (FFC), a flexible circuit board (FPC), or the like as used in electronic devices or the like, but may be any type of board.

Note that in the present embodiment, expressions indicating direction such as top, bottom, left, right, front, rear, and the like used to describe a configuration and operation of each part of the first connector 1, second connector 101, and the like are relative rather than absolute, and are proper when each part of the first connector 1, second connector 101, and the like are in positions illustrated in the figures, but should be changed and interpreted according to a change in position with a change in posture.

The first connector 1 is what is called a plug connector type, and includes a first housing 11 as a connector main body integrally formed using an insulating material such as a synthetic resin. As illustrated in the drawings, the first housing 11 has a substantially rectangular thick plate-like shape that is a substantially rectangular parallelepiped. An elongated recessed groove part 13 extending in a longitudinal direction (X-axis direction) of the first housing 11 and a first protruding part 12 as an elongated protrusion defining an outside of the recessed groove part 13 and extending in the longitudinal direction of the first housing 11 are integrally formed on the side fitted in the second connector 101 of the first housing 11, namely, on the side of a mating surface 11*a* (Z-axis positive direction side). The first protruding part 12 is formed along both sides of the recessed groove part 13 and along both sides of the first housing 11. For example, the first connector 1 has dimensions of a length of approximately 10.0 mm, a width of approximately 1.1 mm, and a thickness of approximately 0.5 mm. However, the dimensions can be changed as appropriate.

The first terminal 61 as a terminal is attached to each of the first protruding parts 12. A plurality (for example, approximately 25) of first terminals 61 are formed on two, left and right, sides at a predetermined pitch (for example, approximately 0.35 mm). The pitch and the number of the first terminals 61 can be appropriately changed. In the recessed groove part 13, the side mounted on the first substrate, in other words, the side of a mounting surface 11*b* (Z-axis negative direction side) is closed by a bottom plate.

The first terminal 61 may be retained while press-fitted in the first housing 11. However, in this case, the first terminal 61 will be described as a member integrated with the first housing 11 by over-molding (insert molding). In other words, the first housing 11 is molded by setting the first terminals 61 inside and then filling in a cavity of a metal mold with a resin. Therefore, it should be noted that although the first terminal 61 does not exist apart from the first housing 11, for convenience, in FIG. 3, the first terminal 61 is illustrated apart from the first housing 11.

The first terminal 61 is a member integrally formed by performing a process such as punching, bending, and the like on a conductive metal plate, and contains a first contacting part 65, a connecting part 64 connected to an upper end of the first contacting part 65, a second contacting part 66 connected to an outer end of the connecting part 64, and a tail part 62 connected to a lower end of the first contacting part 65. The tail part 62 extends toward an outer side of the first housing 11 and is connected to a connection pad coupled to a conductive trace of the first substrate by soldering or the like. The conductive trace is typically a signal line. Additionally, the surfaces of the first contact part 65, the connection unit 64, and the second contact part 66 are exposed to each side surface of the first protruding part 12 and the mating surface 11*a*.

A first protruding end part 21 serving as a fitting guide is arranged on each of two sides in the longitudinal direction of the first housing 11. The first protruding end part 21 is a thick member extending in a width direction (Y-axis direction) of the first housing 11, two ends of the first protruding end part 21 are connected to two ends in the longitudinal direction of the first protruding part 12, and an upper surface of the first protruding end part 21 has an essentially rectangular shape. In a state in which the first connector 1 and the second connector 101 are fitted together, the first protruding end part 21 functions as an insertion protruding part inserted into a mating recessed part 122 of a second protruding end part 121 included in the second connector 101. A first reinforcement fitting 51 serving as a reinforcement fitting is attached to the first protruding end part 21.

The first reinforcement fitting 51 is a member integrally formed by punching, bending, or the like on a metal plate, and contains: an upper surface part 52 covering at least a portion of an upper surface 21*a* of the first protruding end part 21; an end surface part 53 covering at least a portion of an end surface 21*c*, which is a surface of the first protruding end part 21 on an outer side in the longitudinal direction of the first housing 11; and a first side surface part 54 and the second side surface part 55 serving as side surface parts covering at least a portion of side surfaces 21*d*, which are two surfaces on an outer side in the width direction (Y-axis direction) of the first housing 11 of the first protruding end part 21. Note that a tail part 54*a* extending to an outer side in the width direction of the first housing 11 is connected to a lower end of the first side surface part 54.

The upper surface part 52 is a flat plate extending parallel to the mating surface 11*a* and the mounting surface 11*b*. Furthermore, the end surface part 53 is a flat plate connected to an outer end edge in the longitudinal direction of the first housing 11 on the upper surface part 52 and extending toward the mounting surface 11*b* (in the negative Z-axis direction). Furthermore, the first side surface part 54 is a flat plate connected to an outer end edge in the width direction of the first housing 11 on the upper surface part 52 and extending toward the mounting surface 11*b*. Note that the second side surface part 55, which is a flat plate essentially parallel to the first side surface part 54 and extending toward the mounting surface 11*b*, is connected to the outer end edge in the width direction of the first housing 11 on the end surface part 53.

Furthermore, an end surface recessed part 22*a* is formed on the end surface 21*c* of the first protruding end part 21, and a first side surface recessed part 22*b* and a second side surface recessed part 22*c* are formed on the side surface 21*d* of the first protruding end part 21. Furthermore, when the first reinforcement fitting 51 is attached to the first protruding end part 21, the first reinforcement fitting 51 is lowered relative to the first housing 11 from a position illustrated in FIG. 3, the end surface part 53 is inserted into and accommodated in the end surface recessed part 22*a*, and the first side surface part 54 and the second side surface part 55 are inserted into and accommodated in the first side surface recessed part 22*b* and the second side surface recessed part 22*c*. Note that a recessed part 21*b* is formed on the upper surface 21*a* of the first protruding end part 21, and at least the lower end of an auxiliary piece 55*e* described later, provided by the second side surface part 55, is inserted into and accommodated in the recessed part 21*b*.

The tail part 54*a* of the first side surface part 54 is connected by soldering or the like to a connection pad connected to a conductive trace of the first substrate. The conductive trace is typically a power line or a ground line. The lower end of the end surface part 53 is similarly connected to the connection pad of the first substrate by soldering or the like.

The second connector 101 is a so-called receptacle connector type, and contains a second housing 111 serving as a mating connector main body integrally formed using an insulating material such as a synthetic resin or the like. As illustrated in the drawings, the second housing 111 has a substantially rectangular thick plate-like shape that is a substantially rectangular parallelepiped, and a substantially rectangular recessed part 112 that is fitted in the first housing 11 of the first connector 1 is formed on the side on which the first connector 1 is fitted, namely, on the side of the mating surface 111*a* (Z-axis negative direction side), a periphery of the recessed part 112 being surrounded. For example, the second connector 101 has dimensions of a length (a size in the X-axis direction) of approximately 11.0 mm, a width (a size in the Y-axis direction) of approximately 1.9 mm, and a thickness (a size in the Z-axis direction) of approximately 0.6 mm. However, the dimensions can be changed as appropriate.

A second protruding part 113 as an islet fitted in the recessed groove part 13 of the first connector 1 is integrally formed with the second housing 111 in the recessed part 112, and a sidewall part 114 extending parallel to the second protruding part 113 is integrally formed with the second housing 111 on both sides (the side of the positive Y-axis direction and the side of the negative Y-axis direction) of the second protruding part 113. The second protruding part 113 and the sidewall part 114 protrude upward (negative Z-axis direction) from a bottom plate demarcating a bottom surface of the recessed part 112, and extend in the longitudinal direction (X-axis direction) of the second housing 111. Consequently, a recessed groove portion 112*a*, which is an elongated recessed portion extending in the longitudinal direction of the second housing 111, is formed as a part of the recessed part 112 on both the sides of the second protruding part 113.

A second terminal accommodating inside cavity 115*a* having a recessed groove shape is formed on side surfaces on both the sides of the second protruding part 113. A second terminal stowing outer cavity 115*b* having a recessed groove shape is formed in a side surface on the inside of the sidewall parts 114. The second terminal stowing inner cavity 115*a* and the second terminal stowing outer cavity 115*b* are coupled together and are integrated with each other at the bottom surface of the recessed groove portion 112*a*, so that the second terminal stowing inner cavity 115*a* and the second terminal stowing outer cavity 115*b* are described as a second terminal stowing cavity 115 when collectively described. The second terminal stowing cavity 115 is formed so as to penetrate the bottom plate in a plate thickness direction (Z-axis direction).

In the present Embodiment, the second terminal stowing cavity 115 is formed on both the sides in the width direction (Y-axis direction) of the second housing 111 while arranged in the longitudinal direction of the second housing 111. Specifically, only a similar number of terminals are formed on two sides of the second protruding part 113 at a pitch similar to that of the first terminal 61 of the first connector 1. The pitch and the number of the second terminal stowing cavity 115 can be changed as appropriate. Furthermore, only a similar number of second terminals 161, serving as terminals accommodated in each of the second terminal stowing cavities 115 and attached to the second housing 111, are also arranged at a similar pitch on two sides of the second protruding part 113.

The second terminal 161 is a member integrally formed by performing processing such as punching and bending on a conductive metal plate, and includes a held unit 163, a tail 162 connected to the lower end of the held unit 163, an upper connection unit 167 connected to the upper end of the held unit 163, a second contact part 166 connected to the lower end of the upper connection unit 167 and opposed to the held unit 163, a lower connection unit 164 connected to the lower end of the second contact part 166, and an inside connection unit 165 connected to an end of the lower connection unit 164 on the opposite side to the second contact part 166.

The retained portion 163 is a portion that is fitted in and held by the second terminal stowing outer cavity 115*b* while extending in a mating direction (Z-axis direction), namely, in the thickness direction of the second housing 111. The tail part 162 is bent and connected to the retained part 163, extends in a left-right direction (Y-axis direction), in other words, an outer side in the width direction of the second housing 111, and is connected to the connection pad coupled to the conductive trace of the second substrate by soldering or the like. The conductive trace is typically a signal line. The upper connection unit 167 is a portion that is curved so as to protrude upward (negative Z-axis direction).

The second contact part 166 extending downward (positive Z-axis direction) is connected to the lower end of the upper connection unit 167 on the opposite side to the held unit 163. The lower connection unit 164 is a portion including a substantially U-shaped side surface connected to the lower end of the second contact part 166. A first contact part 165*a* curved by about 180 degrees is connected to the upper end of the inside connection unit 165 so as to protrude upward and toward the second contact part 166.

The second terminal 161 is fitted in the second terminal stowing cavity 115 from the side of the mounting surface 111*b* that is a lower surface (a surface in the positive Z-axis direction) of the second housing 111, and the retained portion 163 is sandwiched from both sides by the sidewalls of the second terminal stowing outer cavity 115*b* formed on the side surface on the inside of the sidewall parts 114, whereby the second terminal 161 is fixed to the second housing 111. In this state, namely, in the state in which the second terminal 161 is loaded into the second housing 111, the first contact part 165*a* and the second contact part 166 are positioned on the right and left sides of the recessed groove 112*a* and face each other. The second terminal 161 is a member integrally formed by processing a metal plate, and thus has a certain degree of elasticity. As is clear from the shape, an interval between the first contact part 165*a* and the second contact part 166 facing each other can be elastically changed. That is, when the first terminal 61 included in the first connector 1 is inserted between the first contact part 165*a* and the second contact part 166, the interval between the first contact part 165*a* and the second contact part 166 is elastically elongated.

Furthermore, the second protruding end part 121 serving as a counterpart mating guiding part is arranged on two ends in the longitudinal direction of the second housing 111. The mating recessed parts 122 are formed as part of the recessed part 112 in each second protruding end part 121. The mating recessed parts 122 are substantially rectangular recess parts that are connected to both ends in the longitudinal direction of each recessed groove part 112*a*. Furthermore, in a state in which the first connector 1 and the second connector 101 are mated inside the mating recessed part 122, the first protruding end part 21 provided on the first connector 1 is inserted.

Furthermore, the second protruding end part 121 has a side wall which, viewed from a mating direction, is an abbreviated U-shaped side wall and which demarcates three sides of the mating recessed part 122. Furthermore, an island end recessed part 113*a*, which is recessed, is formed on an end part in the longitudinal direction of the second protruding part 113.

A second reinforcing metal fitting 151 as a reinforcement fitting attached to the second housing 111 is attached to the second protruding end part 121. The second reinforcement fitting 151 is a member integrally formed by punching, bending, or the like on a metal plate, and contains: an upper surface part 152 covering at least a portion of an upper surface of an end wall part the second protruding end part 121; an end surface part 153 covering at least a portion of an end surface, which is a surface of the second protruding end part 121 on an outer side in the longitudinal direction of the second housing 111; a side surface part 155 covering at least a portion of side surfaces, which are two surfaces on an outer side in the width direction (Y-axis direction) of the second housing 111 of the second protruding end part 121; and a bottom surface covering part 158 covering at least a portion of a bottom surface of the mating recessed part 122. Note that the upper surface part 152 contains a side connecting part 152*a* and a front connecting part 152*b*. The side surface part 155 is connected to a tip end of the side connecting part 152*a*, and the bottom surface covering part 158 is connected to a tip end of the front connecting part 152*b*. Furthermore, a contact piece 155*a* extending diagonally downward toward the bottom surface of the mating recessed part 122 is connected to an upper end of the side surface part 155, and an island end covering part 158*a* is connected to a tip end of the bottom surface covering part 158. A tip end of the island end covering part 158*a* is inserted into the island end recessed part 113*a*. Furthermore, a lower end vicinity of the contact piece 155*a* is a portion that elastically contacts and conducts electricity with the second side surface part 55 of the first reinforcement fitting 51 when the first connector 1 and the second connector 101 are mated.

A lower end of the side surface part 155 is connected to the connection pad coupled to the conductive trace of the second substrate by soldering or the like. The conductive trace is typically a power line or a ground line. The lower end of the end surface part 153 is similarly connected to the connection pad of the second substrate by soldering or the like.

Next, a configuration of the aforementioned first reinforcement fitting 51 will be described in detail.

Figure 6A:
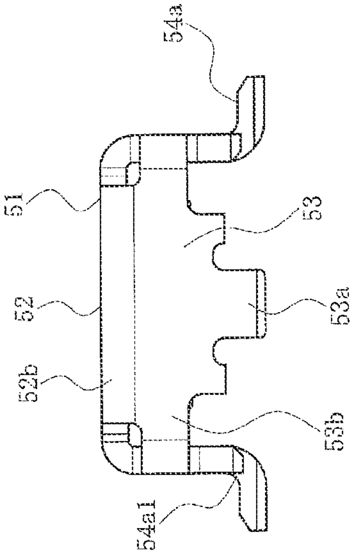
FIGS. 6A-6D are four-plane diagram of a first reinforcement fitting according to the present embodiment, where
Figure 6B:
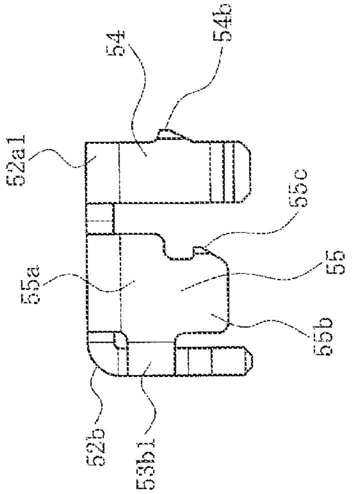
Figure 6C:
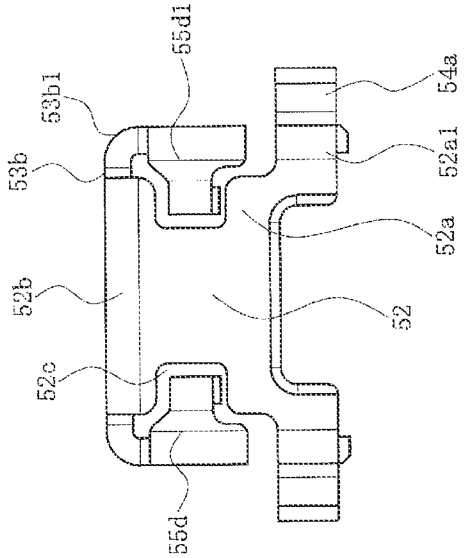
Figure 6D:
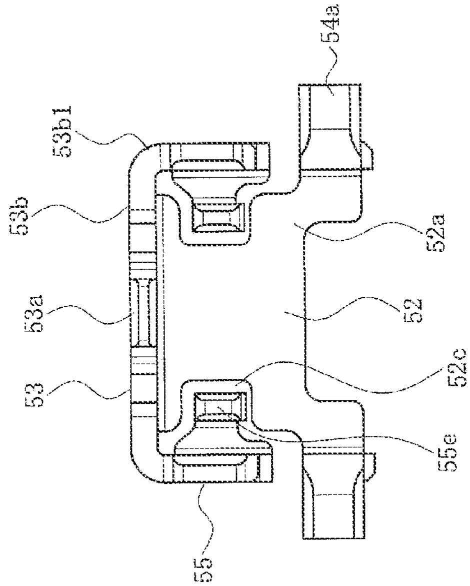
Figure 7B:
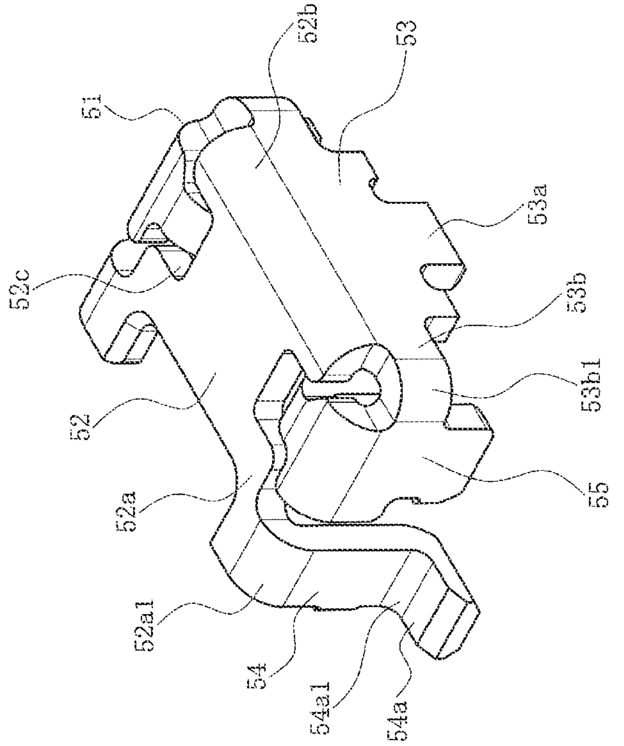
FIGS. 7A and 7B are perspective views illustrating an outer side of the first reinforcement fitting according to the present embodiment, where
Figure 7A:
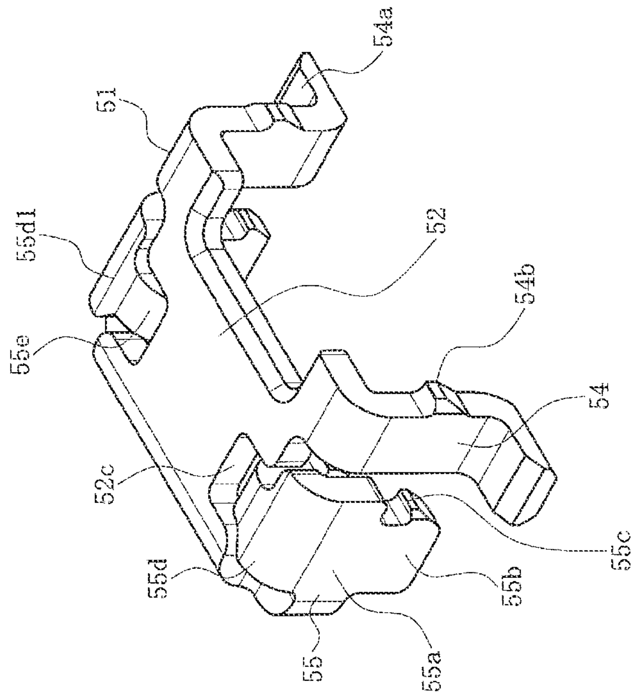
Figure 8B:
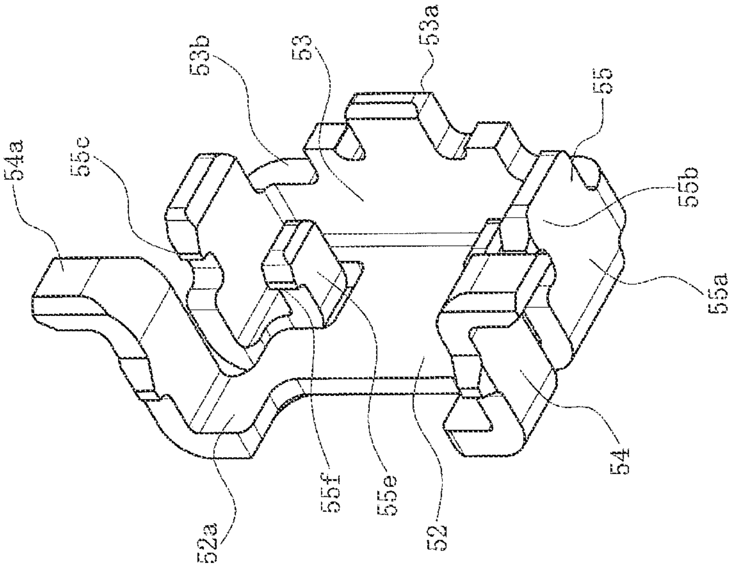
FIGS. 8A and 8B are perspective views illustrating an inner side of the first reinforcement fitting according to the present embodiment, where
Figure 8A:
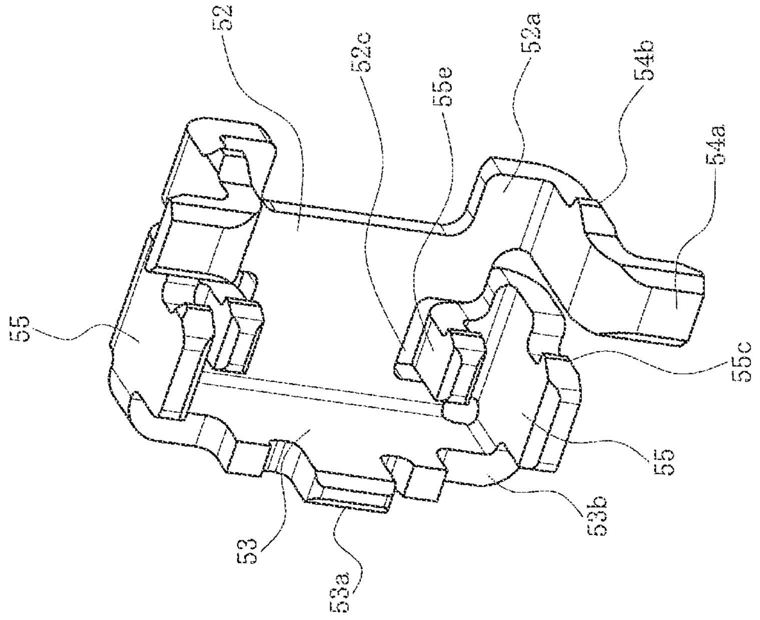
Figure 9A:
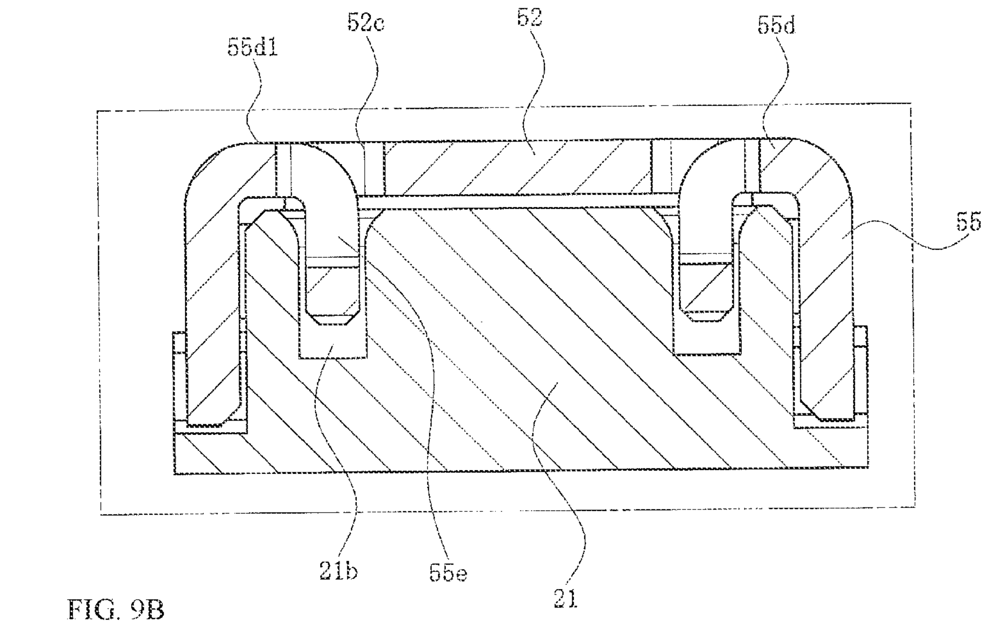
FIGS. 9A and 9B are cross section views of the first reinforcement fitting attached to a first housing according to the present embodiment, where
Figure 9B:
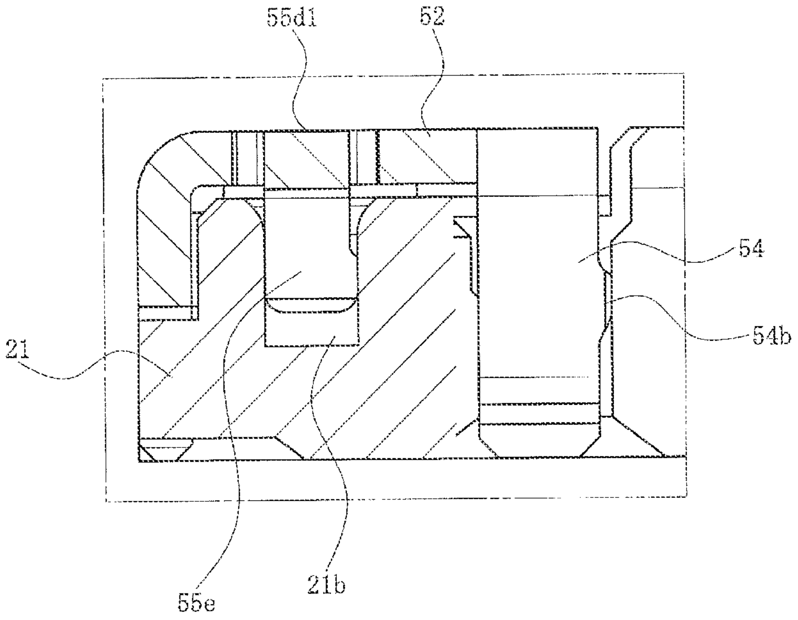
Figure 10A:
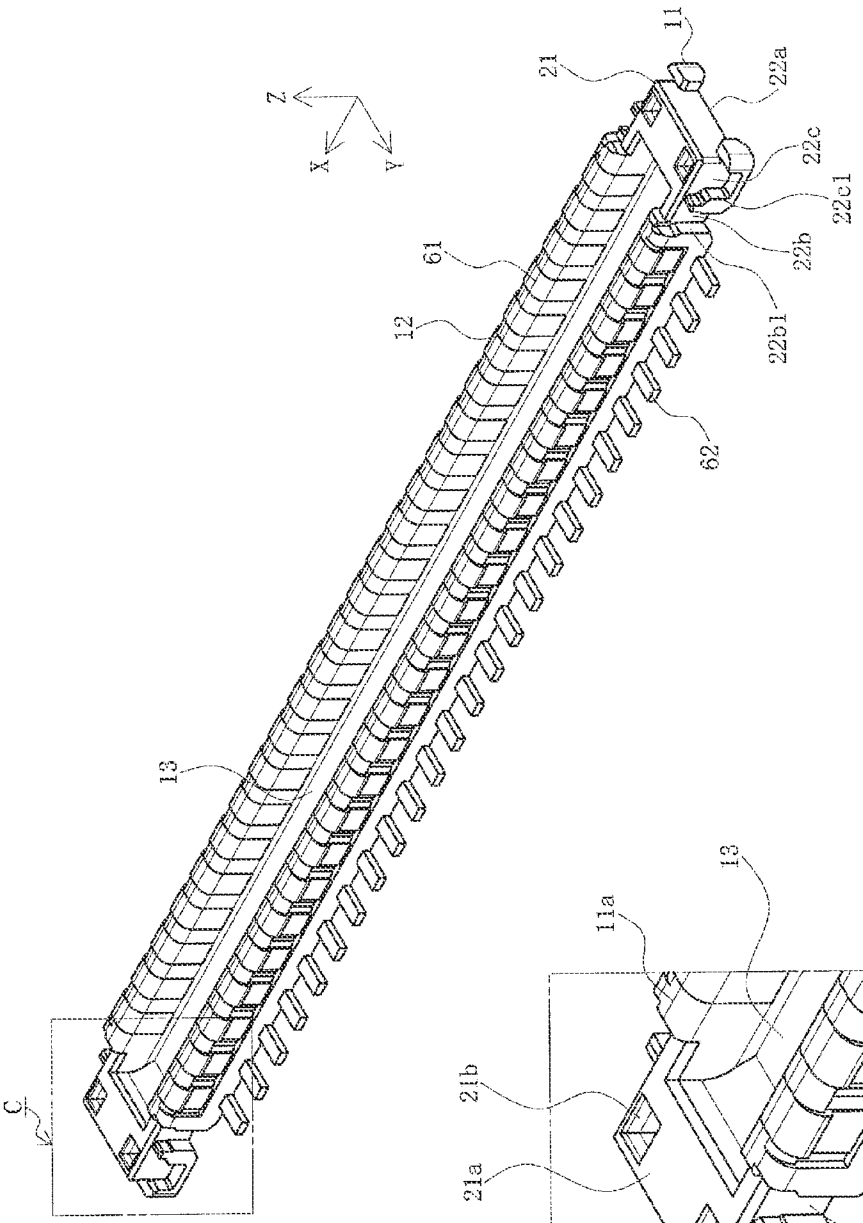
FIGS. 10A and 10B are perspective views illustrating a first protruding end part of the first housing to which the first reinforcement fitting is attached, according to the present embodiment, where
Figure 10B:
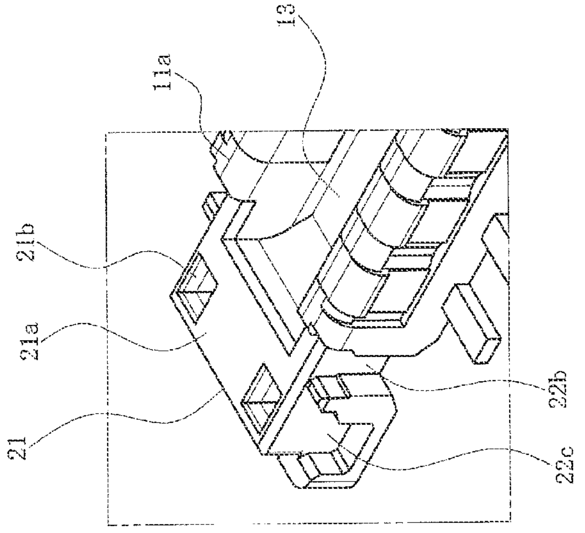
Figure 11:
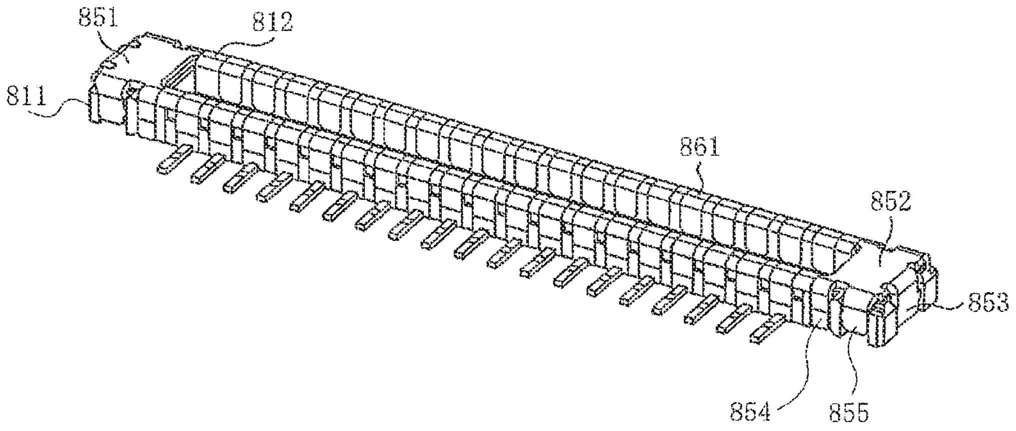
Prior art FIG. 11
FIG. 11 is a perspective view illustrating a conventional connector.

FIGS. 6A-6D are four-plane diagram of the first reinforcement fitting according to the present embodiment; FIGS. 7A and 7B are perspective views illustrating an outer side of the first reinforcement fitting according to the present embodiment; FIGS. 8A and 8B are perspective views illustrating an inner side of the first reinforcement fitting according to the present embodiment; FIGS. 9A and 9B are cross-sections illustrating the first reinforcement fitting attached to the first housing according to the present embodiment; and FIGS. 10A and 10B are perspective views illustrating the first protruding end part of the first housing to which the first reinforcement fitting is attached according to the present embodiment. Note that in FIGS. 6A-6D, FIG. 6A is a front surface view, FIG. 6B is a side view, FIG. 6C is a top view, and FIG. 6D is a bottom view. In FIGS. 7A, 7B, 8A and 8B, FIGS. 7A and 8A are first perspective views and FIGS. 7B and 8B are second perspective views. In FIGS. 9A and 9B, FIG. 9A is a cross section view viewed along arrows A-A in FIG. 2A and FIG. 9B is a cross section view viewed along arrows B-B in FIG. 2A. In FIGS. 10A and 10B, FIG. 10A is an overall view and FIG. 10B is an enlarged view of part C in FIG. 10A.

In the present embodiment, the upper surface part 52 of the first reinforcement fitting 51 contains a front connecting piece 52*a* connected to each of two, left and right, sides of a front end, which is an inner side end in the longitudinal direction of the first housing 11 therein. As illustrated in FIG. 6C, the front connecting piece 52*a* is a strip shaped plate having an abbreviated crank shape when viewed from the vertical direction (mating direction), and as illustrated in FIG. 7B, at a tip end thereof is a front curved part 52*a*1 that bends approximately 90 degrees so as to face downward when viewed from the longitudinal direction of the first housing 11. When the front connecting piece 52*a* is not formed, an upper end of the front curved part 52*a*1 may be connected to two, left and right, sides near the front end of the upper surface part 52 of the first reinforcement fitting 51.

Furthermore, a tip end of the front curved part 52*a*1, in other words, a lower end, is connected to the upper end of the first side surface part 54 extending toward the mounting surface 11*b*, in other words, in a downward direction. Note that as illustrated in FIG. 6A, the tip end of the first side surface part 54, in other words, the lower end, has a lower end curved part 54*a*1 that is bent approximately 90 degrees so as to face to an outer side in the width direction of the first housing 11, as viewed from the longitudinal direction of the first housing 11. Furthermore, a tail part 54 extending to an outer side in the width direction of the first housing 11 is connected to a tip end of the lower end curved part 54*a*1. The tail part 54*a* is connected by soldering or the like to a connection pad connected to a conductive trace of the first substrate. Furthermore, an engaging protrusion 54*b* is formed on an inner end in the longitudinal direction of the first housing 11, in other words, a front end, of the first housing 11 in the first side surface part 54. When the first side surface part 54 is inserted into the first side surface recessed part 22*b* of the first housing 11, the engaging protrusion 54*b* engages with a front side inner side wall 22*b*1 of the first side surface recessed part 22*b* as illustrated in FIG. thereby retaining the first side surface part 54 stably in the first side surface recessed part 22*b*.

Furthermore, the aforementioned upper surface part 52 is connected to a rear end, which is an outer end in the longitudinal direction of the first housing 11 therein, and contains a rear curved part 52*b* that is bent approximately 90 degrees so as to face downward when viewed from the width direction of the first housing 11, as illustrated in FIG. 6B. Furthermore, the upper end of the end surface part 53 is connected to a tip end, in other words, a lower end, of the rear curved part 52*b*.

The end surface part 53 contains a lower protruding part 53*a* connected to the lower end thereof and protrudes in a downward direction in the center of the width direction (Y-axis direction). A lower end of the lower protruding part 53*a* is connected to a connection pad of the first substrate by soldering or the like. The end surface part 53 contains a side connecting piece 53*b* connected to two side ends on the left and right. The side connecting piece 53*b* is a strip shaped plate extending to an outer side in the width direction, and a side curved part 53*b*1 is formed at a tip end thereof, which is bent and curved by approximately 90 degrees so as to face forward, as illustrated in FIGS. 6C and 6D.

Furthermore, a tip end, in other words, a front end, of the side curved 53B1 is connected to an outer end, in other words, a rear end, in the longitudinal direction of the first housing 11 at the second side surface part 55. The second side surface part 55 contains a flat upper side part 55*a* and a lower side part 55*b* extending in up-down and front-to-back directions, in other words, in an X-Z direction. As illustrated in FIG. 6B, the upper side part 55*a* is formed to be wider than the lower side part 55*b*, specifically, so as to have a larger dimension in the front-to-back direction. Note that a rear end of the upper side part 55*a* and a rear end of the lower side part 55*b* are at the same position with regard to the longitudinal direction of the first housing 11; therefore, a front end of the upper side part 55*a* is positioned closer to an inner side in the longitudinal direction of the first housing 11 than a front end of the lower side part 55*b*, in other words, a forward direction.

An outer surface of the upper side part 55*a* is a portion in contact with the lower end vicinity of the contact piece 155*a* of the second reinforcement fitting 151 of the second connector 101. As illustrated in FIG. 6B, the upper side part 55*a* is formed with a larger dimension in the front-to-back direction than the first side surface part 54 and, moreover, than the lower side part 55*b*. Therefore, even if a slight misalignment occurs when the first connector 1 and the second connector 101 are mated, contact of the second reinforcement fitting 151 with the lower end vicinity of the contact piece 155*a* can be reliably maintained. Furthermore, an engaging protrusion 55*c* is formed at a front end of the lower side part 55*b*. When the second side surface part 55 is inserted into the second side surface recessed part 22*c* of the first housing 11, the engaging protrusion 55*c* engages with a front side inner side wall 22*c*1 of the second side surface recessed part 22*c* as illustrated in FIG. 10A, thereby retaining the second side surface part 55 stably in the second side surface recessed part 22*c*.

Furthermore, as illustrated in FIG. 9A, an upper end of the upper side part 55*a* is connected to an upper end curved portion 55*d* having a tip end is curved so as to face downward or obliquely downward, and an upper end of the auxiliary piece 55*e* extending downward or obliquely downward is connected to the tip end of the upper end curved part 55*d*. Note that in FIGS. 7A to 9B and the like, only an example in which the auxiliary piece 55*e* extends downward essentially vertically and not diagonally downward, is drawn for convenience of illustration. Furthermore, an engaging protrusion 55*f* is formed on a front end of the auxiliary piece 55*e*. When a portion of the auxiliary piece 55*e* including at least the lower end is inserted into the recessed part 21*b* of the first housing 11, the engaging protrusion 55*f* engages with a front side inner side wall of the recessed part 21*b*, thereby retaining the auxiliary piece 55*e* stably in the recessed part 21*b*.

Note that a recessed part 52*c* is formed as a recessed part recessed toward the inside in the width direction on both side edges in the width direction of the upper surface part 52. Furthermore, at least a portion of an upper end vicinity portion of the second side surface part 55, and specifically, a tip end vicinity of the upper end curved part 55*d* and the auxiliary piece 55*e* are inserted into the insertion recessed part 52*c*, and a portion including at least the lower end of the auxiliary piece 55*e* is inserted and retained in the recessed part 21*b*. Note that the tip end vicinity of the upper end curved part 55*d* and the auxiliary piece 55*e* do not contact the insertion recessed part 52*c*, and therefore, the second side surface part 55 and the upper surface part 52 are not in contact.

Thus, by inserting at least a portion of the upper end vicinity portion of the second side surface part 55 into the insertion recessed part 52*c*, the position of the top surface 55*d*1 of the upper end curved part 55*d*, which is an upper end surface of the second side surface part 55, can be precisely controlled. Specifically, the position of the top surface 55*d*1 with regard to the thickness direction (Z-axis direction) of the first housing 11 can be controlled so as to not be higher than the position of the upper surface part 52. In other words, as illustrated in FIG. 9A, the position of the top surface 55*d*1 can be controlled to be the same as the position of the upper surface part 52 or lower than the position of the upper surface part 52 with regard to the thickness direction of the first housing 11. If the position of the top surface 55*d*1 with regard to the thickness direction of the first housing 11 is higher than that of the upper surface part 52, when the first connector 1 is slid forward and backward or left and right (in the X-axis or Y-axis direction) relative to the second connector 101 during a mating operation between the first connector 1 and the second connector 101, the top surface 55*d*1 and a vicinity thereof may catch on the second reinforcement fitting 151 or the like of the second connector 101, and the second side surface part 55 may roll up. However, in the present embodiment, the tip end vicinity of the upper end curved part 55*d* and the auxiliary piece 55*e* are inserted into the insertion recessed part 52*c*; therefore, the position of the top surface 55*d*1 can be controlled so as to not be higher than the position of the upper surface part 52. Furthermore, if a portion of the auxiliary piece 55*e*, including at least the lower end, is inserted and retained in the recessed part 21*b* of the first housing 11, the position of the top surface 55*d*1 can be more reliably controlled so as to not be higher than the position of the upper surface part 52.

Furthermore, although the present embodiment describes the first reinforcement fitting 51 in which the insertion recessed part 52*c*, the upper end curved part 55*d* and the auxiliary piece 55*e* are formed, and a first reinforcement fitting 51 in which these are not formed may also be used. Specifically, a recessed portion of the insertion recessed part 52*c* has a plate piece as an upper surface, and the shape of the second side surface part 55 does not have the upper end curved part 55*d* and auxiliary piece 55*e*. Even in this case, the upper end of the second side surface part 55 can still be controlled so as to not be higher than the position of the upper surface part 52.

Furthermore, in the first reinforcement fitting 51 of the present embodiment, the end surface part 53 is connected to the upper surface part 52 via the rear curved part 52*b*, the first side surface part 54 is connected to the upper surface part 52 via the front connecting piece 52*a* including the front curved part 52*a*1, and the second side surface part 55 is connected to the end surface part 53 via the side connecting piece 53*b* including the side curved part 53*b*1. In general, in preparing a fitting such as the first reinforcement fitting 51, a sheet of metal is punched to form an essentially flat member in which each part is integrally connected, and then the essentially flat member is bent to obtain a final three-dimensional shape. In the case of the aforementioned first reinforcement fitting 51, a sheet of metal is punched to form an essentially flat plate member in which parts corresponding to each part including the upper surface part 52, the end surface part 53, the first side surface part 54, and the second side surface part 55 are integrally connected, and then the essentially flat plate member is bent to form a curved part such as the rear curved part 52*b*, the front curved part 52*a*1, the side curved part 53*b*1, and the like. Thus, the first reinforcement fitting 51, which is a product having a three-dimensional shape as illustrated in FIGS. 6A to 8B and the like, can be ultimately obtained. Thus, it can then be seen that the first side surface part 54 and the second side surface part 55, which cover each of the side surfaces 21*d* on two sides in the width direction of the first housing 11, are portions obtained by individually bending, although the portions are in close proximity to each other in the first reinforcement fitting 51, which is the final product.

Therefore, in the first reinforcement fitting 51 of the present embodiment, the position of the first side surface part 54 and the position of the second side surface part 55 can be individually and precisely controlled with regard to the width direction (Y-axis direction) of the first housing 11. For example, the outer surface of the first side surface part 54 and the outer surface of the second side surface part 55 with regard to the width direction of the first housing 11 can be accurately flush. Furthermore, the position of the first side surface part 54 with regard to the width direction of the first housing 11 can be more on an outer side than the position of the second side surface part 55, taking into account that the connection strength of the first reinforcement fitting 51 to the first substrate is more stable when the distance between the left and right tail parts 54*a* is wide. Furthermore, the position of the outer surface of the second side surface part 55 with regard to the width direction of the first housing 11 can be adjusted strictly in accordance with the position in the lower end vicinity of the contact piece 155*a* of the second reinforcement fitting 151 of the second connector 101 that contacts therein.

Furthermore, in the present embodiment, when the first reinforcement fitting 51 is connected to the first substrate by soldering, solder or flux caused by the solder or flux rise does not adhere to the second side surface part 55 in contact with the lower end vicinity of the contact piece 155*a* of the second reinforcement fitting 151. In the first reinforcement fitting 51, soldering is applied on the tail part 54*a* connected to the lower end of the first side surface part 54 and on the lower end of the lower protruding part 53*a* of the end surface part 53. However, even if the first side surface part 54 and the second side surface part 55 are in close proximity to each other on two sides in the width direction of the first housing 11, solder or flux cannot effectively reach the second side surface part 55 due to having to travel a long path through the first side surface part 54, the front connecting piece 52*a*, the upper surface part 52, the end surface part 53, the side connecting piece 53$b$, and the like to reach the second side surface part 55 from the tail part 54$a$. Furthermore, the solder or flux applied to the lower end of the lower protruding part 53$a$ of the end surface part 53 also needs to travel a long path, passing along the end surface part 53 for a distance in the width direction of approximately ½ of the width of the first connector 1, which is a dimension sufficiently larger than the pitch of the first terminal 61, and further passing through the side connecting piece 53$b$, and therefore does not reach the second side surface part 55.

Note that if solder or flux must be more reliably prevented from adhering, a barrier part for preventing solder or flux from rising can be formed in the lower end vicinity of the first side surface part 54 and the upper end vicinity of the lower protruding part 53$a$. For example, when the first reinforcement fitting 51 is a member to which nickel (Ni) plating is applied as a base plating on a surface of a metal plate, and gold (Au) plating is further applied to a side surface such as a front side, back side, or the like of the first side surface part 54 including the tail part 54$a$ and the lower end curved part 54$a$1, and to a side surface such as a front side, back side, or the like of the end surface part 53 including the lower protruding part 53$a$, a laser beam is irradiated to melt the gold and expose the nickel at a surface in a portion irradiated by the laser beam to form the barrier part. If the barrier part is formed so as to form an elongated strip shape extending in the X-axis and Y-axis directions on the side surface such as a front side, back side, or the like in the lower end vicinity of the first side surface part 54, and on the side surface such as a front side, back side, or the like in the lower end or the upper end vicinity of the lower protruding part 53$a$ of the end surface part 53, the solder or flux rising above the barrier part is prevented. Therefore, adhesion of solder or flux to the second side surface part 55 can be more reliably prevented.

Subsequently, the operation of mating together the first connector 1 and the second connector 101 with the above configuration will be described.

Herein, the tail part 62 of the first terminal 61 is connected to a connection pad connected to a conductive trace of the first substrate (not illustrated) by soldering or the like, the tail part 54$a$ of the first side surface part 54 of the first reinforcement fitting 51 is connected to a connection pad connected to a conductive trace of the first substrate by soldering or the like, and the lower end of the lower protruding part 53$a$ of the end surface part 53 is connected to a connection pad of a first substrate by soldering or the like, such that the first connector 1 is surface mounted on the first substrate. Note that the conductive trace connected to the connection pad to which the tail part 62 of the first terminal 61 is connected is a signal line, and the conductive trace connected to the connection pad to which the tail part 54$a$ of the first side surface part 54 of the first reinforcement fitting 51 is connected is a power line. Furthermore, the connection pad to which the lower end of the lower protruding part 53$a$ of the end surface part 53 is connected may or may not be connected to a power line.

Similarly, the tail part 162 of the second terminal 161 is connected to a connection pad connected to a conductive trace of the second substrate (not illustrated) by soldering or the like, the lower end of the side surface part 155 of the second reinforcement fitting 151 is connected to a connection pad connected to a conductive trace of the second substrate by soldering or the like, and the lower end of the end surface part 153 is connected to a connection pad of a second substrate by soldering or the like, such that the second connector 101 is surface mounted on the second substrate. Note that the conductive trace connected to the connection pad to which the tail part 162 of the second terminal 161 is connected is a signal line, and the conductive trace connected to the connection pad to which the side surface part 155 of the second reinforcement fitting 151 is connected is a power line. Furthermore, the connection pad to which the lower end of the end surface part 153 is connected may or may not be connected to a power line.

First, an operator sets the mating surface 11$a$ of the first housing 11 of the first connector 1 and the mating surface 111$a$ of the second housing 111 of the second connector 101 facing each other as illustrated in FIG. 5, and the position of the first protruding part 12 of the first connector 1 matches the position of the corresponding recessed groove part 112$a$ of the second connector 101. When the position of the first protruding end part 21 of the first connector 1 matches the position of the corresponding mating recessed part 122 of the second connector 101, positioning of the first connector 1 and the second connector 101 is completed.

In this state, when the first connector 1 and/or the second connector 101 are moved in a direction approaching the other side, in other words, in a mating direction, the first protruding part 12 and the first protruding end part 21 of the first connector 1 are inserted into the recessed groove part 112$a$ and the mating recessed part 122 of the second connector 101. Consequently, when the fitting between the first connector 1 and the second connector 101 is completed, the first terminal 61 and the second terminal 161 enter into a conduction state.

Incidentally, the first connector 1 and the second connector 101 are mounted on the first and second substrates, respectively, which have a large area. Therefore, the operator cannot visually see the mating surface 11$a$ of the first connector 1 and the mating surface 111$a$ of the second connector 101 and must perform a mating operation by feeling. As a result, the position of the first connector 1 and the position of the second connector 101 may be misaligned due to an inability to perform accurate alignment by feeling.

In this state, if the operator moves the first connector 1 and/or the second connector 101 in the mating direction, the first protruding end part 21 of either of the first connectors 1 contacts the second protruding end part 121 of either of the second connectors 101, and the first protruding end part 21 receives a large pressing force from the second protruding end part 121 in the mating direction, in other words, from above to below in FIG. 1.

However, in the present embodiment, the first reinforcement fitting 51 is attached to the first protruding end part 21, most of the upper surface 21$a$ of the first protruding end part 21 is covered by the upper surface part 52 of the first reinforcement fitting 51, most of the end surface part 21$c$ of the first protruding end part 21 is covered by the end surface part 53 of the first reinforcement fitting 51, and most of the side surface 21$d$ of the first protruding end part 21 is covered by the first side surface part 54 and the second side surface part 55 of the first reinforcement fitting 51. Therefore, even if a large pressing force is received from the second protruding end part 121, the pressing force is transmitted from the first reinforcement fitting 51 to the first substrate. Thus, the pressing force is hardly transmitted to the first protruding end part 21. Therefore, the first protruding end 21 is not damaged or broken, and high strength can be exhibited.

Thus, in the present Embodiment, the first connector 1 has the first housing 11, the first terminal 61 attached to the first housing 11, and the first reinforcement fitting 51 attached to the first housing 11. Furthermore, the first housing 11 contains a first protruding end part 21 which is a first protruding end part 21 formed at two ends in the longitudinal direction, and which mates with the second protruding end part 121 formed at two ends in the longitudinal direction of the second housing 111 of the second connector 101. The first reinforcement fitting 51 contains: the upper surface part 52 covering at least a portion of the upper surface 21*a* of the first protruding end part 21; the end surface part 53 covering at least a portion of the end surface 21*c* of the first protruding end part 21; the first side surface part 54 covering at least a portion of the side surfaces 21*c* of the first protruding end part 21; and the second side surface part 55 covering at least a portion of each side surface 21*d* of the first protruding end part 21. The end surface part 53 is connected to the upper surface part 52, the first side surface part 54 is connected to the upper surface part 52, and the second side surface part 55 is positioned closer to the end surface 21*c* of the first protruding end part 21 than the first side surface part 54 and is connected to the end surface part 53.

As a result, the first connector 1 can be provided with the first reinforcement fitting 51 that is small and low profile, yet exhibits high strength and accurate dimensional accuracy, and thus reliability is improved.

Furthermore, an upper end of the end surface part 53 is connected to the upper surface part 52 via the rear curved part 52*b*, an upper end of the first side surface part 54 is connected to the upper surface part 52 via the front curved part 52*a*1, and a rear end of the second side surface part 55 is connected to the end surface part 53 via the side curved part 53*b*1. Therefore, the bending process can be separately applied to obtain the first side surface part 54 and the second side surface part 55, and thus the position of the first side surface part 54 and the position of the second side surface part 55 can be separately and precisely controlled with regard to the width direction of the first housing 11.

Furthermore, the upper surface part 52 contains a front connecting piece 52*a* that connects to two sides on the left and right of a front end thereof, upper ends of the first side surface parts 54 each connect to a tip end of each front connecting pieces 52*a* via the front curved part 52*a*1 and extend in an up-down direction, the end surface part 53 contains a side connecting piece 53*b* that connects to two side ends on the left and right, and rear ends of the second side surface parts 55 each connect to a tip end of each side connecting piece 53*b* via the front curved part 53*b*1 and extend in the up-down direction. As a result, the first side surface part 54 and the second side surface part 55 can be obtained by a separate machining process, and thus the position of the first side surface part 54 and the position of the second side surface part 55 can be easily controlled.

Furthermore, the upper surface part 52 contains an insertion recessed part 52*c* formed on two side edges in a width direction thereof, the second side surface parts 55 each contain an upper end curved part 55*d* connected to an upper end thereof, and an auxiliary piece 55*e* connected to a tip end of the upper end curved part 55*d* and that extends downward or diagonally downward, and the auxiliary piece 55*e* is inserted in the insertion recessed part 52*c*. Thus, the auxiliary piece 55*e* is inserted into the insertion recessed part 52*c*; therefore, the position of the top surface 55*d*1 of the upper end curved part 55*d*, which is an upper end surface of the second side surface part 55, can be controlled so as to not be higher than the position of the upper surface part 52.

Furthermore, the recessed part 21*b* is formed in the upper surface 21*a* of the first protruding end part 21, and at least the lower end of the auxiliary piece 55*e* is inserted into the recessed part 21*b*. Therefore, a state in which the auxiliary piece 55*e* is inserted into the insertion recessed part 52*c* is stably maintained.

Furthermore, the tail part 54*a* connected to a connection pad on a substrate is also connected to the lower end of the first side surface part 54, the lower protruding part 53*a* connected to the connection on the substrate is connected to the lower end of the end surface part 53, and the barrier part that prevents solder rising or flux rising is formed on the side surface of the first side surface part 54 and end surface part 53. Therefore, adhesion of solder or flux to the second side surface part 55 can be reliably prevented.

Furthermore, gold plating is applied above a nickel base plating on a side surface of the first side surface part 54 and end surface part 53, and the barrier part is a portion where nickel is exposed on a surface. Therefore, a barrier part that prevents solder or flux rising can be easily formed by irradiating a laser beam.

Note that the disclosure herein describes features relating to suitable exemplary embodiments. Various other embodiments, modifications, and variations within the scope and spirit of the claims appended hereto will naturally be conceived of by those skilled in the art upon review of the disclosure herein. For example, the staggered arrangement of the terminals does not have to be regular. In addition, the arrangement of the terminals on the left and right half body parts do not need to be the same. Furthermore, the left and right half body parts do not need to be axially symmetric.

The present disclosure can be applied to a connector and a connector pair.

The invention claimed is:

1. A connector configured to mate with a counterpart connector, the connector comprising:

a connector main body including an upper surface, a side surface and an end surface, the upper surface and the end surface meeting at a first corner, and the side surface and the end surface meeting at a second corner;

a terminal attached to the connector main body; and a reinforcement fitting attached to the connector main body and including an upper surface part, an end surface part, a rear curved part connecting the upper surface part to the end surface part, a side surface part, a side curved part connecting the end surface part to the side surface part, and wherein the rear curved part covers the first corner, and the side curved part covers the second corner.

2. The connector according to claim 1, wherein the side surface part further includes an upper end curved part which contacts and conducts with a reinforcement fitting of the counterpart connector.

3. The connector according to claim 1, wherein side edges of the upper surface part each contain an insertion recessed part formed in a width direction thereof, the side surface part is connected to an upper end curved part and includes a support piece extending downward or obliquely downward, and the support piece is inserted into one of the insertion recessed parts.

4. The connector according to claim 1, wherein the end surface part includes a downward protruding part connected to a bottom end thereof and a bottom end of the downward protruding part is configured to be connected to a connection pad on a substrate.

5. The connector according to claim 1, wherein a bottom end of the side surface part is not configured to be connected to a connection pad on a substrate.

6. The connector according to claim 2, wherein side edges of the upper surface part contain an insertion recessed part formed in a width direction thereof;

the side surface part includes a first part and a second part;

an upper end curved part and a support piece extending downward or obliquely downward therefrom are connected to the second part, and wherein the support piece is inserted into one of the insertion recessed parts.

7. A connector pair comprising the connector according to claim 1, and the counterpart connector.

8. A connector pair comprising the connector according to claim 3, and the counterpart connector.

9. A connector pair comprising the connector according to claim 6, and the counterpart connector.

10. The connector according to claim 1, wherein connector main body further includes a second end surface, the upper surface and the second end surface meeting at a third corner, and the side surface and the second end surface meeting at a fourth corner; and a second reinforcement fitting attached to the connector main body and covering the third and fourth corners.

11. A connector pair comprising the connector according to claim 10, and the counterpart connector.

12. A connector configured to mate with a counterpart connector, the connector comprising:

a connector main body including an upper surface, a first side surface, a second side surface, and an end surface, the upper surface and the end surface meeting at a first corner, the first side surface and the end surface meeting at a second corner, and the second side surface and the end surface meeting at a third corner;

a terminal attached to the connector main body; and a reinforcement fitting attached to the connector main body and including an upper surface part, an end surface part, a rear curved part connecting the upper surface part to the end surface part, first and second side surface parts, a first side curved part connecting the end surface part to the first side surface part, and a second side curved part connecting the end surface part to the second side surface part, and wherein the rear curved part covers the first corner, the first side curved part covers the second corner, and the second side curved part covers the third corner.

13. The connector according to claim 12, wherein first and second side edges of the upper surface part each contain an insertion recessed part formed in a width direction thereof, and each side surface part includes a first part and a second part; and further comprising:

a first upper end curved part and a first support piece extending downward or obliquely downward therefrom are connected to the second part of the first side surface part, wherein the first support piece is inserted into the insertion recessed part in the first side edge, and a second upper end curved part and a second support piece extending downward or obliquely downward therefrom are connected to the second part of the second side surface part, wherein the second support piece is inserted into the insertion recessed part in the second side edge.

14. A connector pair comprising the connector according to claim 13, and the counterpart connector.

15. The connector according to claim 12, wherein the end surface part includes a downward protruding part connected to a bottom end thereof and a bottom end of the downward protruding part is configured to be connected to a connection pad on a substrate.

16. The connector according to claim 12, wherein connector main body further includes a second end surface, the upper surface and the second end surface meeting at a third corner, the first side surface and the second end surface meeting at a fourth corner, and the second side surface and the second end surface meeting at a fifth corner; and a second reinforcement fitting attached to the connector main body and covering the third, fourth and fifth corners.

17. A connector pair comprising the connector according to claim 16, and the counterpart connector.

18. A connector pair comprising the connector according to claim 12, and the counterpart connector.

* * * * *